United States Patent
Yeh

(10) Patent No.: US 11,631,925 B2
(45) Date of Patent: Apr. 18, 2023

(54) BATTERY SAFETY DEVICE

(71) Applicant: Industrial Technology Research Institute, Hsin-Chu (TW)

(72) Inventor: Sheng-Fa Yeh, Miaoli (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 365 days.

(21) Appl. No.: 16/862,989

(22) Filed: Apr. 30, 2020

(65) Prior Publication Data
US 2021/0210739 A1 Jul. 8, 2021

(30) Foreign Application Priority Data

Jan. 6, 2020 (TW) ................................. 109100350

(51) Int. Cl.
*H01M 10/42* (2006.01)
*H01M 50/581* (2021.01)
(Continued)

(52) U.S. Cl.
CPC ....... *H01M 50/581* (2021.01); *H01M 10/052* (2013.01); *H01M 10/4235* (2013.01);
(Continued)

(58) Field of Classification Search
CPC ............ H01M 50/581; H01M 10/443; H01M 10/4235; H01M 2200/00; H01M 2200/10;
(Continued)

(56) References Cited

U.S. PATENT DOCUMENTS 5,766,793 A * 6/1998 Kameishi ............ H01M 50/572
429/62
8,236,439 B2 8/2012 Byun et al.
(Continued)

FOREIGN PATENT DOCUMENTS

CN 101997133 A 3/2011
CN 103137937 6/2013
(Continued)

OTHER PUBLICATIONS

JP OA dated Mar. 23, 2021.
(Continued)

*Primary Examiner* — Jeremiah R Smith
(74) *Attorney, Agent, or Firm* — WPAT, PC

(57) ABSTRACT

A battery safety device is provided, which may be disposed inside a battery, and may include a conductive handle and a temperature-controlled expansion element. The conductive handle may include a connection portion, a left extension portion, a right extension portion, a top extension portion and an actuating sheet. The left extension portion and the right extension portion may be connected to the connection portion and contact the first conductive portion of the polar winding of the battery. The top extension portion may be connected to the connection portion and contact the first electrode terminal of the battery. The actuating sheet may be connected to the connection portion, and there may be an accommodating space between the actuating sheet and the polar winding, and the temperature-controlled expansion element may be disposed in the accommodating space and contact the actuating sheet and the first conductive portion.

10 Claims, 10 Drawing Sheets

(51) Int. Cl.
*H01M 10/052* (2010.01)
*H01M 10/0525* (2010.01)
*H01M 10/44* (2006.01)

(52) U.S. Cl.
CPC ...... *H01M 10/0525* (2013.01); *H01M 10/443* (2013.01); *H01M 2200/00* (2013.01); *H01M 2200/10* (2013.01)

(58) Field of Classification Search
CPC ............. H01M 50/572; H01M 50/574; H01M 10/052; H01M 10/0525
See application file for complete search history.

(56) References Cited

U.S. PATENT DOCUMENTS

| | | | |
|---|---|---|---|
| 8,951,654 | B2 | 2/2015 | Sachdev et al. |
| 9,466,823 | B2* | 10/2016 | Kwak ................. H01M 50/538 |
| 10,103,371 | B2 | 10/2018 | Yeh |
| 2007/0166605 | A1* | 7/2007 | Meguro .............. H01M 50/572 |
| | | | 429/61 |
| 2010/0227205 | A1* | 9/2010 | Byun ................... H01M 50/10 |
| | | | 429/61 |
| 2011/0039136 | A1 | 2/2011 | Byun et al. |
| 2011/0311851 | A1 | 12/2011 | Shinoda et al. |
| 2014/0242426 | A1 | 8/2014 | Kwak et al. |
| 2014/0322578 | A1* | 10/2014 | Shinoda .............. H01M 50/119 |
| | | | 429/94 |
| 2015/0004447 | A1* | 1/2015 | Li ...................... H01M 10/052 |
| | | | 429/61 |
| 2015/0104672 | A1 | 4/2015 | Cai et al. |
| 2015/0188119 | A1 | 7/2015 | Gao et al. |
| 2017/0373339 | A1* | 12/2017 | Cho ................. H01M 10/0587 |
| 2018/0138489 | A1* | 5/2018 | Wang ................. H01M 50/155 |

FOREIGN PATENT DOCUMENTS

| | | |
|---|---|---|
| CN | 203733907 U | 7/2014 |
| CN | 104022255 | 9/2014 |
| CN | 104064833 A | 9/2014 |
| CN | 104600234 | 5/2015 |
| CN | 106299183 A | 1/2017 |
| CN | 206685432 U | 11/2017 |
| CN | 108028349 A | 5/2018 |
| CN | 109148941 A | 1/2019 |
| CN | 106920909 B | 9/2019 |
| EP | 2284932 | 2/2011 |
| JP | 2002358943 | 12/2002 |
| JP | 2008130458 A | 6/2008 |
| JP | 2016110940 A | 6/2016 |
| JP | 2016110959 A | 6/2016 |
| JP | 6293237 | 3/2018 |
| KR | 101902625 | 9/2018 |
| TW | I374563 | 10/2012 |
| TW | I414098 | 11/2013 |
| TW | I569495 | 2/2017 |
| WO | WO2013137451 A1 | 9/2013 |

OTHER PUBLICATIONS

"Development of a theoretically based thermal model for lithium ion battery pack", Cong Zhu, Xinghu Li, Lingjun Song, Liming Xiang, Journal of Power Sources, 2013, 155-164.
TW OA dated Apr. 15, 2020.
CN OA dated Sep. 23, 2022.

* cited by examiner

BATTERY SAFETY DEVICE

CROSS REFERENCE TO RELATED APPLICATION

All related applications are incorporated by reference. The present application is based on, and claims priority from, Taiwan Application Serial Number 109100350, filed on Jan. 6, 2020, the disclosure of which is hereby incorporated by reference herein in its entirety.

TECHNICAL FIELD

The technical field relates to a battery safety device, in particular to a battery safety device capable of effectively enhancing the safety of batteries.

BACKGROUND

Lithium batteries have a lot of advantages, such as high energy density, light weight, environmental-friendly, long service life, etc. Currently, lithium batteries have been comprehensively applied to various devices. However, when a lithium battery is fully charged, the active substances inside the lithium battery would enter excited state. Thus, when an external current path is connected to the lithium battery, the spontaneous discharge of the lithium battery would take place. Therefore, if the lithium battery is short-circuited because of defective insulation, the chemical reaction of the lithium battery may be significantly speeded up, which would generate a large amount of heat and high-temperature gas. Then, the battery would enter thermal runaway.

Besides, if a lithium battery is improperly used (e.g. overcharged), the materials inside the lithium battery may be decomposed because of excessively high voltage, which generates a great deal of gas. Then, the separator of the polar winding of the battery may be broken, such that the battery would enter thermal runaway.

SUMMARY

An embodiment of the disclosure relates to a battery safety device, which is disposed inside a battery. The battery safety device includes a conductive handle and a temperature-controlled expansion element. The conductive handle includes a connection portion, a left extension portion, a right extension portion, a top extension and an actuating sheet. The left extension portion and the right extension portion are connected to the connection portion and contact a first conductive portion of a polar winding of the battery. The top extension portion is connected to the connection portion and contacts a first electrode terminal of the battery. The actuating sheet is connected to the connection portion and there is an accommodating space between the actuating sheet and the polar winding. The temperature-controlled expansion element is disposed in the accommodating space and contacts the actuating sheet and the first conductive portion.

Another embodiment of the disclosure relates to a battery safety device, which is disposed in a battery. The battery safety device includes a first bottom base, a second bottom base, a temperature-controlled expansion element and an actuating sheet. The first bottom base is connected to a first electrode terminal of the battery and a first conductive portion of a polar winding of the battery, and includes a bottom plate and a supporting plate disposed on the bottom plate. The second bottom base is connected to a second electrode terminal of the battery, a second conductive portion of the polar winding of the battery and a battery casing of the battery. The temperature-controlled expansion element is disposed on the bottom plate and contacts the supporting plate. The actuating sheet is disposed on the bottom base and connected to the temperature-controlled expansion element.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
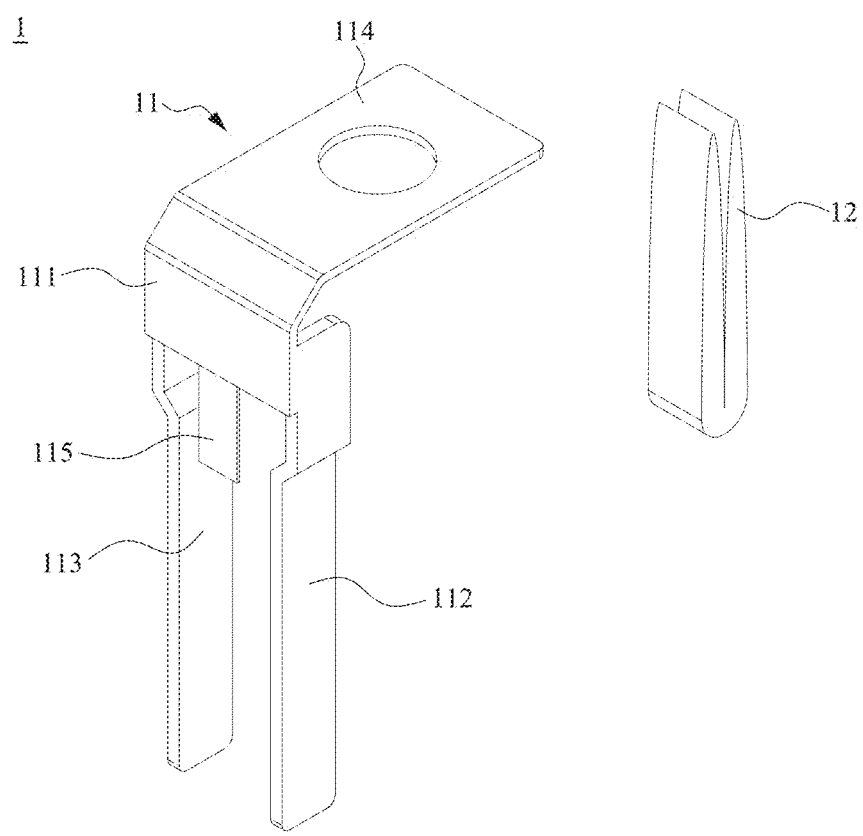
FIG. 1 is an exploded view of a battery safety device in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
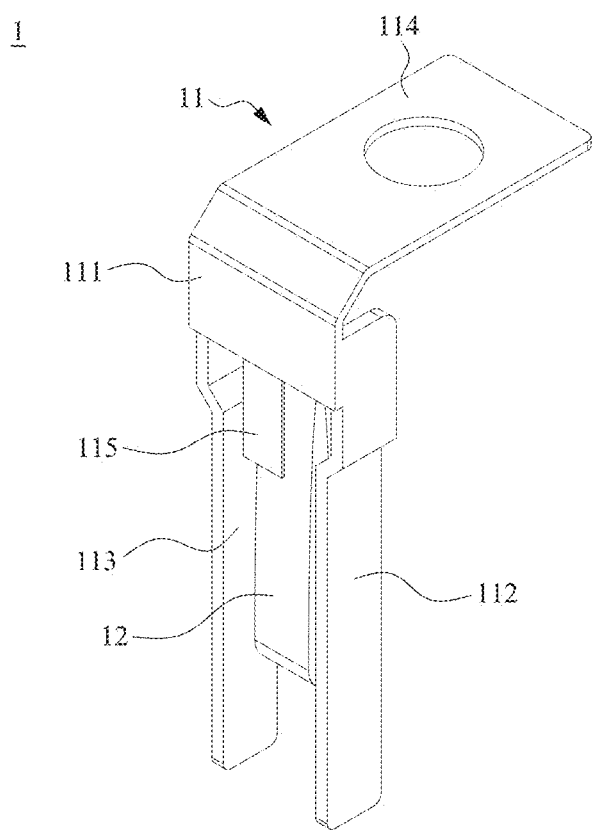
FIG. 2 is an assembly view of the battery safety device of the first embodiment.

Please refer to FIG. 1 and FIG. 2, which are an exploded view and an assembly view of a battery safety device in accordance with a first embodiment of the disclosure. As shown in FIG. 1, the battery safety device 1 includes a conductive handle 11 and a temperature-controlled expansion element 12.

The conductive handle 11 includes a connection portion 111, a left extension portion 112, a right extension portion 113, a top extension portion 114 and an actuating sheet 115. The left extension portion 112 and the right extension portion 113 are connected to the connection portion 111 and extend downward. The top extension portion 114 is connected to the connection portion 111 and extends upward. The actuating sheet 115 is connected to the connection portion 111 and extends downward. In one embodiment, the actuating sheet may be a metal sheet, such as a copper sheet, an aluminum sheet, etc. In another embodiment, the actuating sheet 115 may be a spring, a spring leaf or other similar flexible elements.

The temperature-controlled expansion element 12 is substantially U-shaped and includes a packaging bag and a mixture disposed in the packaging bag. One end of the temperature-controlled expansion element 12 is a bending portion and the other end thereof is an opening portion. Via the above structure, when being expanded due to heat, the temperature-controlled expansion element 12 can effectively generate pressing force. In one embodiment, the aforementioned mixture may include water and a hydrophilic material; the hydrophilic material may be sodium silicate (water glass), sodium polyacrylate or other similar materials. In one embodiment, the material of the packaging bag may be aluminum foil, wax, polypropylene, polycarbonate, polyethylene or other soft polymer materials. In another embodiment, the temperature-controlled expansion element 12 may be rectangular, elliptical or in other different shapes.

As shown in FIG. 2, the temperature-controlled expansion element 12 is disposed in the space between the left extension portion 112, the right extension portion 113 and the actuating sheet 115. Besides, the opening portion of the temperature-controlled expansion element 12 presses against the actuating sheet 115.

The aforementioned structures of the conductive handle 11 and the temperature-controlled expansion element 12 are just for illustration instead of limitation. Any equivalent modification and variation according to the spirit of the disclosure is to be also included within the scope of the following claims and their equivalents.

Figure 3:
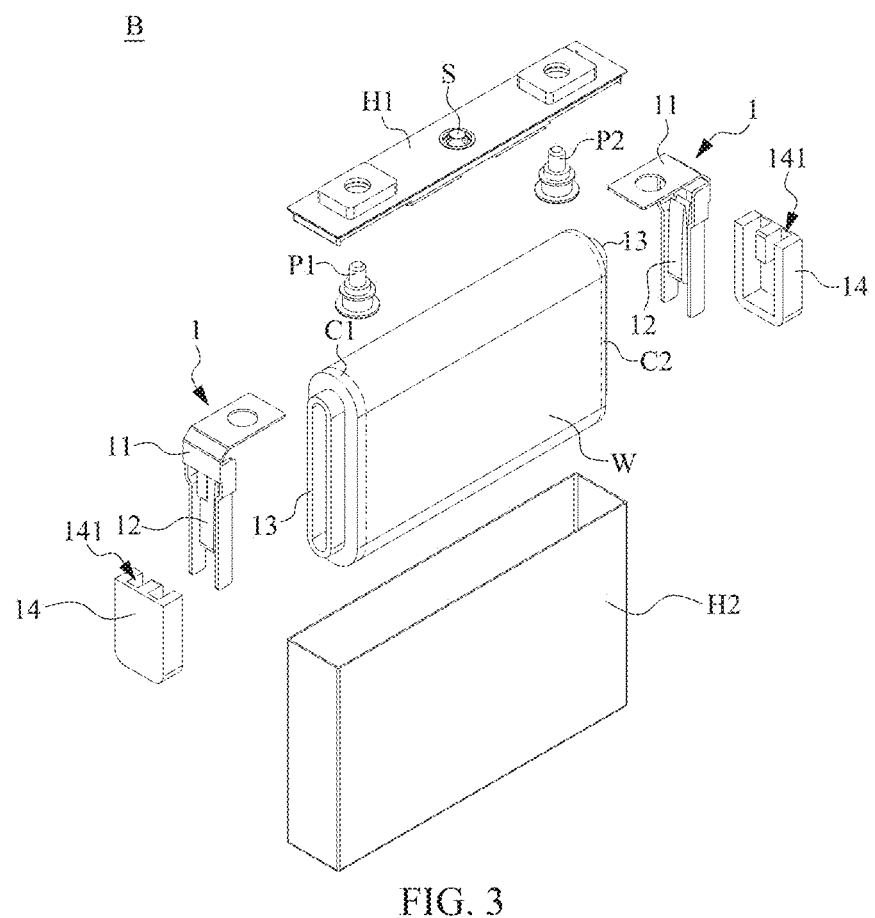
FIG. 3 is an exploded view of a battery having the battery safety device of the first embodiment.
Figure 4:
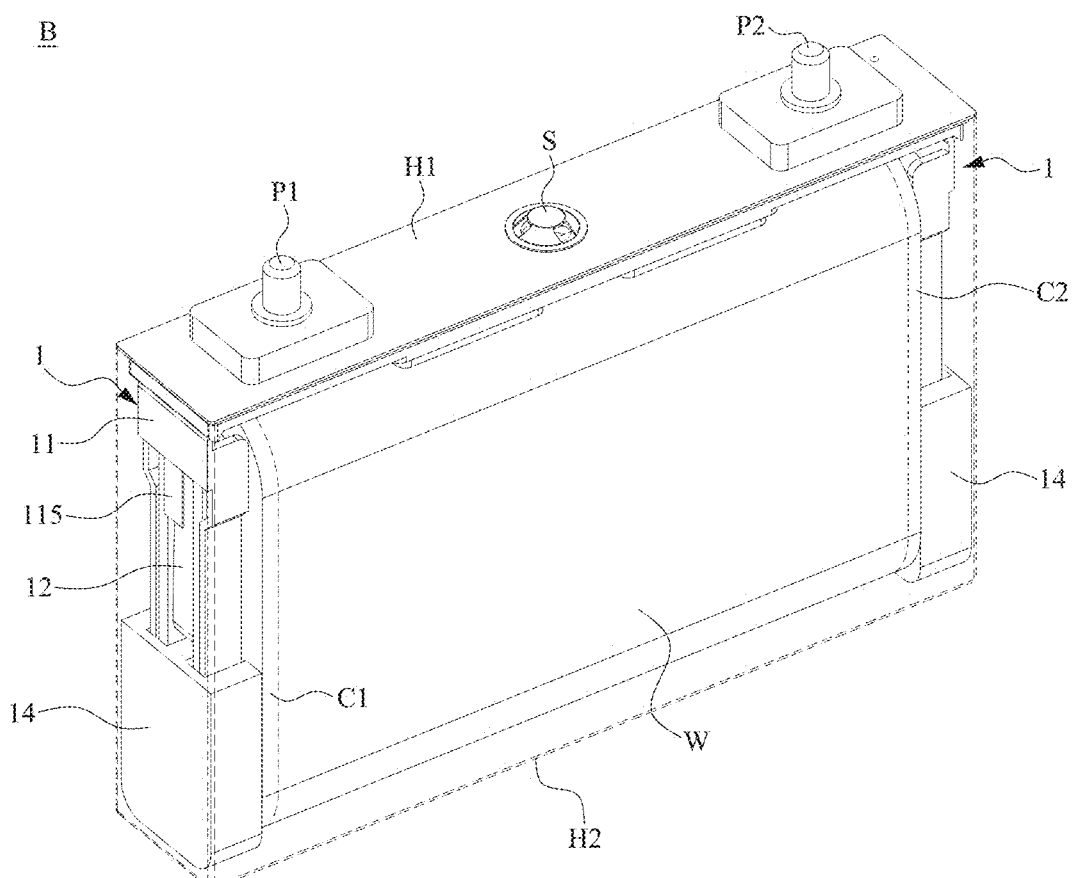
FIG. 4 is an assembly view of the battery having the battery safety device of the first embodiment.
Figure 5:
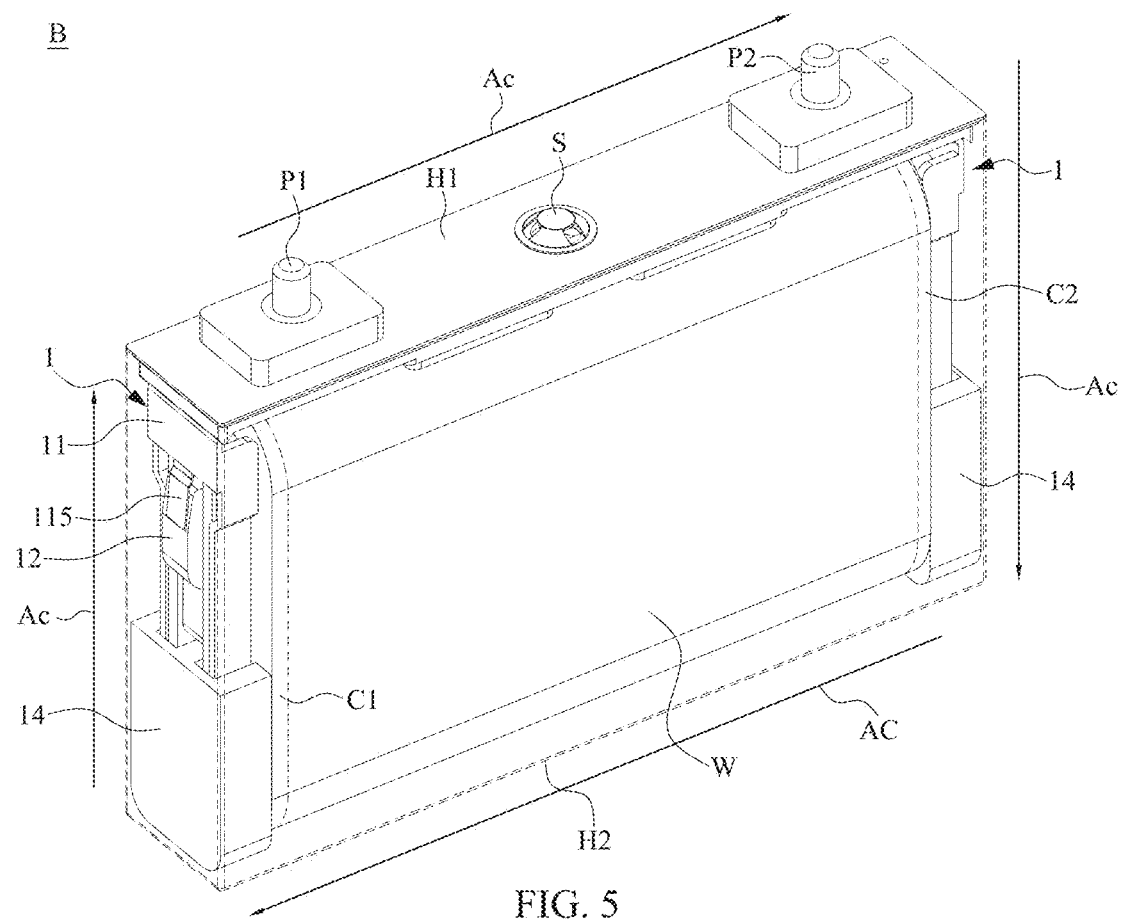
FIG. 5 is a schematic view of a forced short-circuit mechanism of the battery having the battery safety device of the first embodiment.

Please refer to FIG. 3, FIG. 4 and FIG. 5, which are an exploded view, an assembly view and a forced short-circuit mechanism of a battery having the battery safety device of the first embodiment. As shown in FIG. 3 and FIG. 4, the battery B includes a battery casing and a first electrode terminal P1 (the positive terminal), a second electrode terminal P2 (the negative terminal) and a polar winding W disposed inside the battery casing. The battery casing includes an end cap H1 and a case body H2. In addition, the end cap H1 can further include a safety valve S. The structure and function of the safety valve S are supposed to be known by those skilled in the art, so will not be described herein. In the embodiment, the battery B is a lithium battery. In another embodiment, the battery B may be other currently available batteries. As shown in FIG. 3 and FIG. 4, the battery B can have two battery safety devices 1, which can be disposed at two sides of the polar winding W of the battery B respectively.

Regarding the battery safety device 1 on the left side of the drawings, the left extension portion 112 and the right extension portion 113 of the conductive handle 11 of the battery safety device 1 contact a first conductive portion C1 (the positive conductive portion) of the polar winding W. The top extension portion 114 of the conductive handle 11 contacts the first electrode terminal P1 (the positive terminal). There is an accommodating space between the actuating sheet 115 and the polar winding W. In addition, the battery safety device 1 further includes a trough 13 disposed on the first conductive portion C1 of the polar winding W and disposed in said accommodating space. The temperature-controlled expansion element 12 is disposed in the trough 13, such that one side of the opening portion of the temperature-controlled expansion element 12 contacts the first conductive portion C1 and the other side thereof presses against the actuating sheet 115. Moreover, the battery safety device 1 on the left side further includes a fixation base 14. The fixation base 14 is disposed on the first conductive portion C1 of the polar winding W in order to fix the conductive handle 11.

The battery safety device 1 on the right side of the drawings also has similar structure, as set forth above. The left extension portion 112 and the right extension portion 113 of the conductive handle 11 of the battery safety device 1 contact a second conductive portion C2 (the negative conductive portion) of the polar winding W. The top extension portion 114 of the conductive handle 11 contacts the second electrode terminal P2 (the negative terminal). There is an accommodating space between the actuating sheet 115 and the polar winding W. In addition, the battery safety device 1 further includes a trough 13 disposed on the second conductive portion C2 of the polar winding W and disposed in the aforementioned accommodating space. The temperature-controlled expansion element 12 is disposed in the trough 13, such that one side of the opening portion of the temperature-controlled expansion element 12 contacts the second conductive portion C2 and the other side thereof presses against the actuating sheet 115. Similarly, the battery safety device 1 on the right side also includes a fixation base 14. The fixation base 14 is disposed on the second conductive portion C2 of the polar winding W in order to fix the conductive handle 11.

As shown in FIG. 5, when the temperature of the battery B rises because of improper used or other reasons, the mixture inside the temperature-controlled expansion element 12 would be vaporized due to high temperature. In this way, the volume of the mixture increases, so the temperature-controlled expansion element 12 expands to press the actuating sheet 115. Afterward, the actuating sheet 115 is deformed and then contacts the case body H2 of the battery casing. Accordingly, the battery casing, the actuating sheet 115 and the polar winding W can form a current discharge loop. The arrow Ac in FIG. 5 shows the direction where the discharged current flows. The above forced short-circuit mechanism can effectively release energy and decrease the chemical activity of the materials inside the polar winding W of the battery B, so can prevent the battery B from entering thermal runaway.

However, if the battery B is already in thermal runaway, the temperature-controlled expansion element 12 ruptures as a result of high temperature. Then, the ruptured temperature-controlled expansion element 12 can release gas of high flame retardance, which can effectively decrease the flammability of the flammable gas released by the battery B. Thus, the damages caused by thermal runaway of the battery B can be reduced.

In another embodiment, the battery B can also have only one battery safety device 1, which can be disposed at one side of the battery B and connected to the first conductive portion C1 of the polar winding W and the first electrode terminal P1. Besides, the battery casing is connected to the second electrode terminal P2 and the second conductive portion C2 of the polar winding W. In still another embodiment, the battery B can have only one battery safety device 1, which can be disposed at one side of the battery B and connected to the second conductive portion C2 of the polar winding W and the second electrode terminal P2. Moreover, the battery casing is connected to the first electrode terminal P1 and the first conductive portion C1 of the polar winding W. The above structures can activate the forced short-circuit mechanism by only one battery safety device 1.

As described above, the battery safety device 1 of the embodiment can trigger the forced short-circuit mechanism via the temperature-controlled expansion element 12. Such mechanism can force the battery B to discharge to reduce the chemical activity of the materials inside the battery B so as to avoid that the battery B enters thermal runaway and enhance the reliability of the battery B. Thus, the safety of the battery B can be significantly enhanced.

Furthermore, the battery safety device 1 of the embodiment can form a current discharge loop and the battery casing of the battery B is a part of this loop, which can achieve excellent discharge effect. Therefore, the battery safety device 1 can effectively prevent the battery B from entering thermal runaway and further enhance the safety of the battery B.

Figure 6:
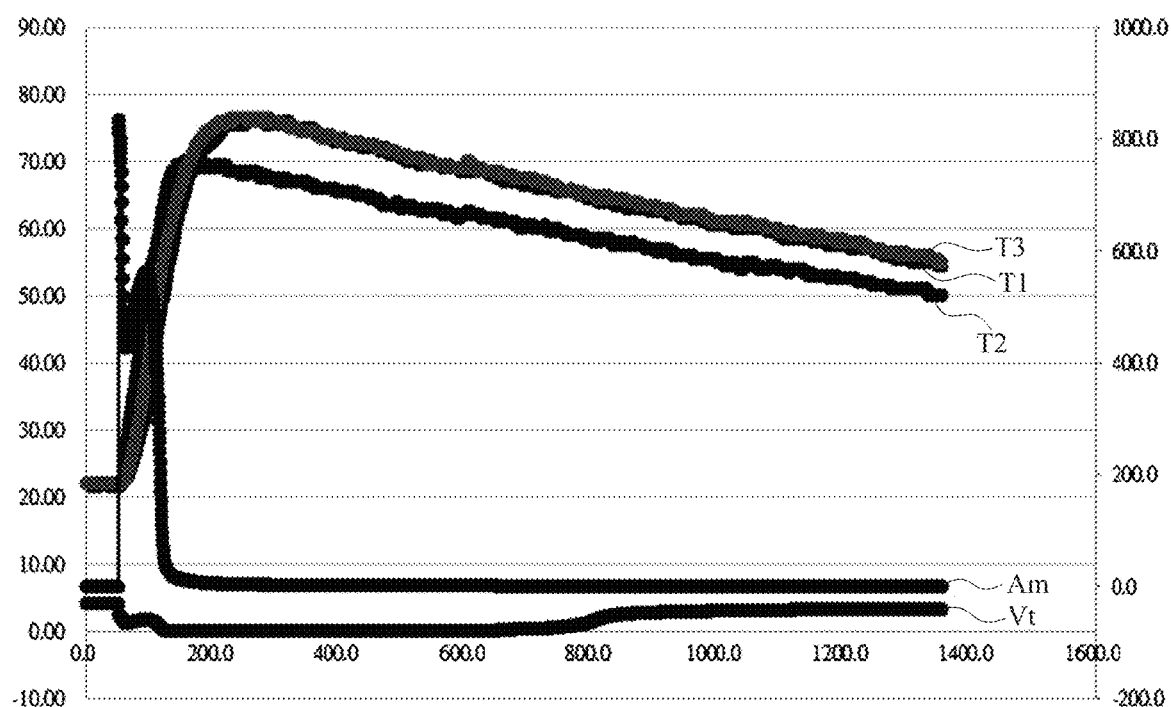
FIG. 6 is an experiment result of the battery having the battery safety device of the first embodiment.

Please refer to FIG. 6, which is an experiment result of the battery having the battery safety device of the first embodiment. In the embodiment, the battery B is fully charged to 4.2V, and the first electrode terminal P1 and the second electrode terminal P2 thereof are connected to an external circuit. The impedance of the external circuit is less than 5 mg. The curve Vt stands for the voltage of the battery B; the curve Am stands for the current of the battery B; the curve T1 stands for the temperature of the first electrode terminal P1; the curve T2 stands for the temperature of the center of the battery B; the curve T3 stands for the temperature of the second electrode terminal P2. As shown in FIG. 6, the temperature of the first electrode terminal P1 of the battery B, the temperature of the center of the battery B and the temperature of the second electrode terminal P2 are obviously decreased. Besides, the current and the voltage of the battery B are also obviously reduced. Accordingly, the battery safety device 1 can actually achieve great technical effects.

The embodiment just exemplifies the disclosure and is not intended to limit the scope of the disclosure. Any equivalent modification and variation according to the spirit of the disclosure is to be also included within the scope of the following claims and their equivalents.

It is worthy to point out that most of currently available battery devices adopt the air-pressured based safety structure, which cannot effectively prevent lithium batteries from entering thermal runaway. On the contrary, according to one embodiment of the disclosure, the battery safety device is provided with a special forced short-circuit structure, which can trigger a forced short-circuit mechanism to form a current discharge loop. Such mechanism can force the battery to discharge in order to reduce the chemical activity of the materials inside the battery, so can effectively prevent the battery from entering thermal runaway and enhance the safety of the battery.

Besides, according to one embodiment of the disclosure, the battery safety device can activate the forced short-circuit mechanism and the battery casing thereof can serve as a part of the current discharge loop, which can achieve greater current discharge effect. Thus, the battery safety device can effectively prevent the battery from entering thermal runaway and enhance the safety of the battery.

Further, according to one embodiment of the disclosure, the battery safety device can trigger the forced short-circuit mechanism via a temperature-controlled expansion element. After the temperature-controlled expansion element ruptures due to high temperature, the gas released by the ruptured temperature-controlled expansion element has excellent flame retardance, which can decrease the flammability of the flammable gas released by the battery with a view to reducing the damages caused by thermal runaway of the battery.

Moreover, according to one embodiment of the disclosure, the battery safety device can activate the forced short-circuit mechanism via the temperature-controlled expansion element, so the forced short-circuit mechanism can be triggered just in time when the temperature is too high. Therefore, the reliability of the battery safety device can be effectively enhanced.

Furthermore, according to one embodiment of the disclosure, the battery safety device is of simple structure, so can achieve the desired technical effects without significantly increasing the cost thereof. Thus, the battery safety device is of high commercial value. As described above, the battery safety device according to the embodiments of the disclosure can actually achieve great technical effects.

Figure 7:
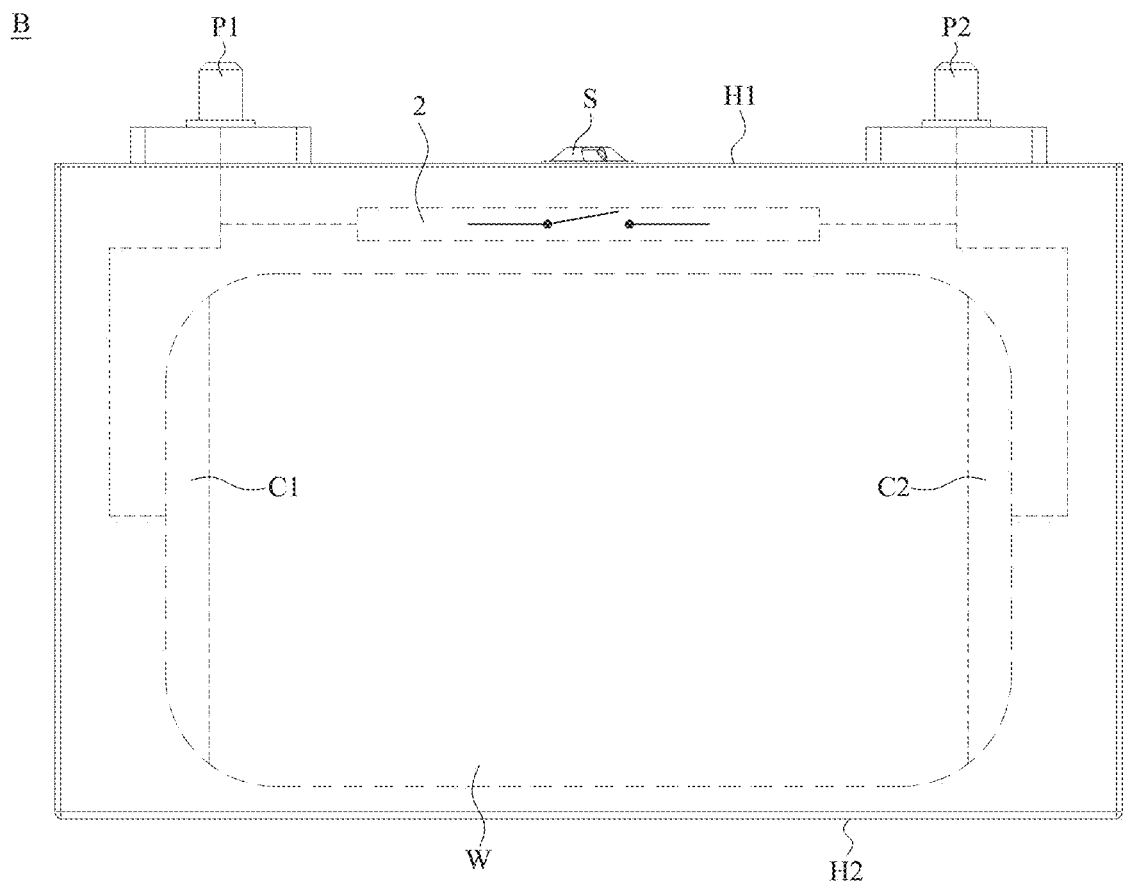
FIG. 7 is a schematic view of a battery having a battery safety device in accordance with a second embodiment of the disclosure.
Figure 8:
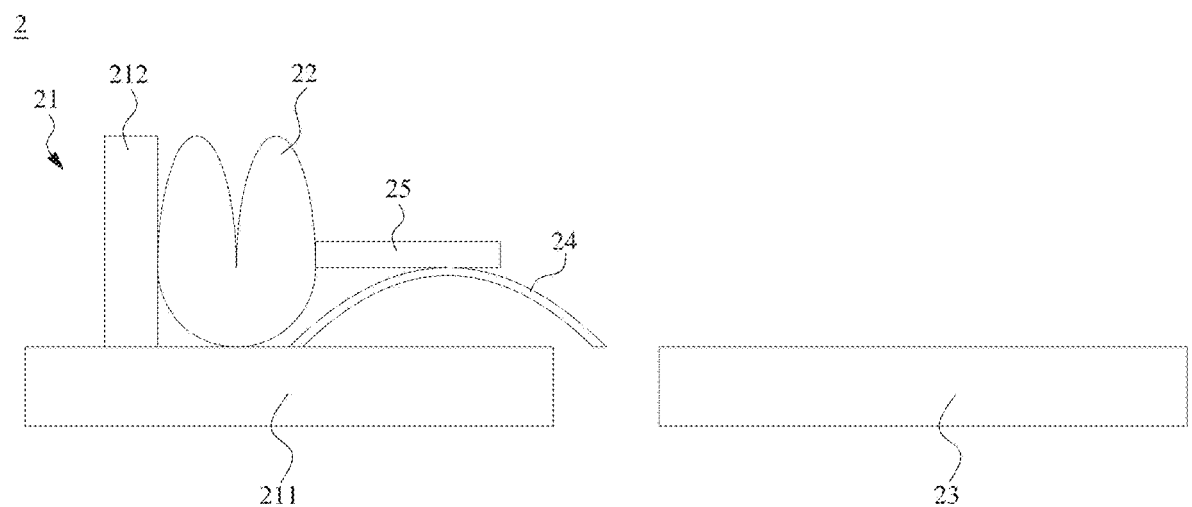
FIG. 8 is a structural view of the battery safety device of the second embodiment.

Please refer to FIG. 7 and FIG. 8, which are a schematic view and a structural view of a battery having a battery safety device in accordance with a second embodiment of the disclosure. As shown in FIG. 7, the battery safety device 2 is disposed inside the battery B. The battery B includes a battery casing, a first electrode terminal P1, a second electrode terminal P2 and a polar winding W disposed inside the battery casing. The battery casing includes an end cap H1 and a case body H2. The end cap H1 further includes a safety valve S. The battery safety device 2 are connected to the first electrode terminal P1, a first conductive portion C1 of the polar winding W, the second electrode terminal P2 and a second conductive portion C2 of the polar winding W.

As shown in FIG. 8, the battery safety device 2 includes a first bottom base 21, a second bottom base 23, a temperature-controlled expansion element 22, an actuating sheet 24 and a limit element 25. The first bottom base 21 is connected to the first electrode terminal P1 and the first conductive portion C1 of the polar winding W. The first bottom 21 includes a bottom plate 211 and a supporting plate 212 disposed on the bottom plate 211.

The temperature-controlled expansion element 22 is disposed on the bottom plate 211 and contacts the supporting plate 212. The temperature-controlled expansion element 22 is substantially U-shaped, and includes a packaging bag and a mixture disposed in the packaging bag. One end of the temperature-controlled expansion element 22 is a bending portion and the other end thereof is an opening portion. The bending portion contacts the bottom plate 211. The structure and the material of the temperature-controlled expansion element 22 are similar to those of the previous embodiment, so will not be described herein again.

The limit element 25 is disposed on the temperature-controlled expansion element 22. There is an accommodating space between the limit element 25 and the bottom plate 211, and the actuating sheet 24 is disposed in the accommodating space. In one embodiment, the actuating sheet 24 may be a metal sheet, such as a copper sheet, an aluminum sheet, etc. In another embodiment, the actuating sheet 24 may be a spring, a spring leaf or other similar flexible elements.

Figure 9:
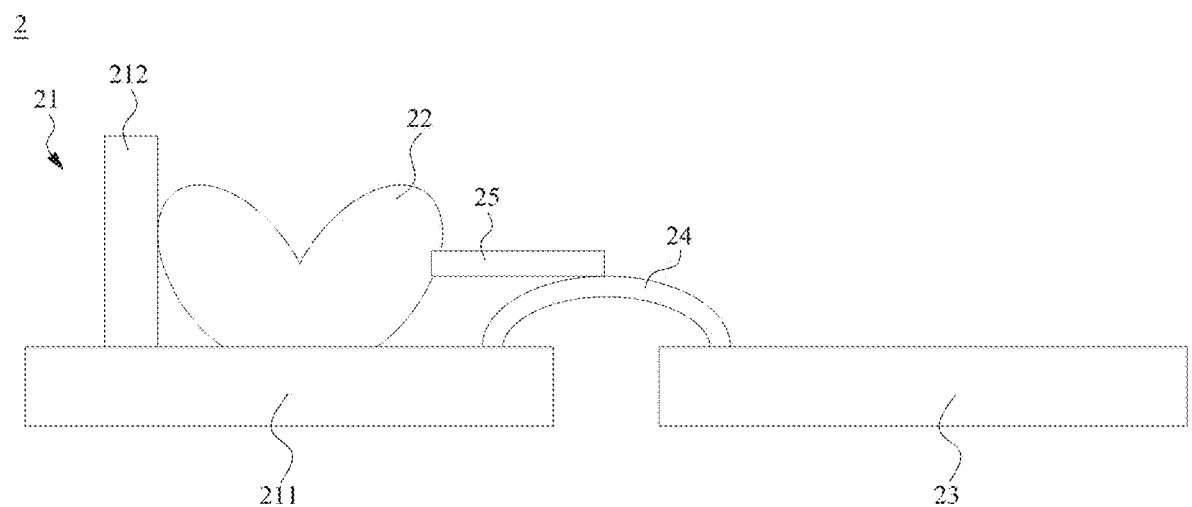
FIG. 9~FIG. 10 are schematic views of a forced short-circuit mechanism of the battery having the battery safety device of the second embodiment.
Figure 10:
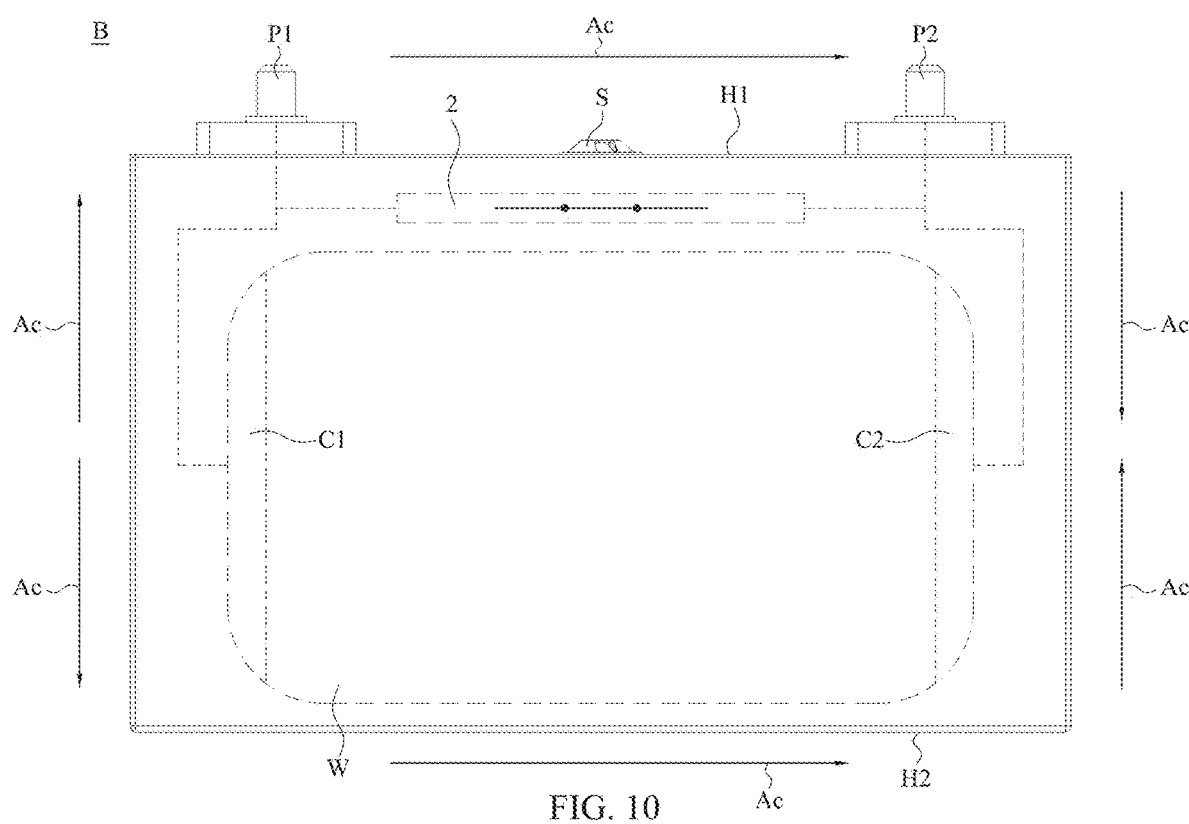

Please refer to FIG. 9 and FIG. 10, which are schematic views of a forced short-circuit mechanism of the battery having the battery safety device of the second embodiment. As shown in FIG. 9, when the temperature of the battery B rises as a result of improper use or other reasons, the mixture inside the temperature-controlled expansion element 22 would be vaporized owing to high temperature. In this way, the volume of the mixture increases, so the temperature-controlled expansion element 22 expands to make the limit element 25 press the actuating sheet 24. Afterward, the actuating sheet 24 is deformed and then contacts the case body H2 of the battery casing. As shown in FIG. 10, the battery casing, the actuating sheet 24 and the winding W form a current discharge loop; the arrow Ac shows the direction where the discharged current flows. The above forced short-circuit mechanism can effectively release energy and reduce the chemical activity of the materials inside the polar winding W of the battery B, so can prevent the battery B from entering thermal runaway.

As described above, the battery safety device 2 of this embodiment can trigger the forced short-circuit mechanism by another type of forced short-circuit structure, which can force the battery B to discharge with a view to decreasing the chemical activity of the materials inside the battery B. Accordingly, the battery safety device 2 can effectively prevent the battery B form entering thermal runaway, so the safety of the battery B can be significantly enhanced.

The embodiment just exemplifies the disclosure and is not intended to limit the scope of the disclosure. Any equivalent modification and variation according to the spirit of the disclosure is to be also included within the scope of the following claims and their equivalents.

In summation of the description above, according to one embodiment of the disclosure, the battery safety device is provided with a special forced short-circuit structure, which can trigger a forced short-circuit mechanism to form a current discharge loop. Such mechanism can force the battery to discharge in order to reduce the chemical activity of the materials inside the battery, so can effectively prevent the battery from entering thermal runaway and enhance the safety of the battery.

Besides, according to one embodiment of the disclosure, the battery safety device can activate the forced short-circuit mechanism and the battery casing thereof can serve as a part of the current discharge loop, which can achieve greater current discharge effect. Thus, the battery safety device can effectively prevent the battery from entering thermal runaway and enhance the safety of the battery.

Further, according to one embodiment of the disclosure, the battery safety device can activate the forced short-circuit mechanism via a temperature-controlled expansion element. After the temperature-controlled expansion element ruptures due to high temperature, the gas released by the ruptured temperature-controlled expansion element has excellent flame retardance, which can decrease the flammability of the flammable gas released by the battery in order to reduce the damages caused by thermal runaway of the battery.

Moreover, according to one embodiment of the disclosure, the battery safety device can activate the forced short-circuit mechanism via the temperature-controlled expansion element, so the forced short-circuit mechanism can be activated just in time when the temperature is too high. Therefore, the reliability of the battery safety device can be effectively enhanced.

Furthermore, according to one embodiment of the disclosure, the battery safety device is of simple structure, so can achieve the desired technical effects without significantly increasing the cost thereof. Thus, the battery safety device is of high commercial value. As described above, the battery safety device according to the embodiments of the disclosure can actually achieve great technical effects.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A battery safety device, disposed inside a battery, comprising:
    a conductive handle, comprising a connection portion, a left extension portion, a right extension portion, a top extension portion and an actuating sheet, wherein the left extension portion and the right extension portion are connected to the connection portion and contact a first conductive portion of a polar winding of the battery, wherein the top extension portion is connected to the connection portion and contacts a first electrode terminal of the battery, wherein the actuating sheet is connected to the connection portion and there is an accommodating space between the actuating sheet and the polar winding; and
    a temperature-controlled expansion element, disposed in the accommodating space and contacting the actuating sheet and the first conductive portion;
    wherein a battery casing of the battery is connected to a second electrode terminal of the battery and a second conductive portion of the polar winding, wherein the temperature-controlled expansion element presses the actuating sheet after being expanded by heat to deform the actuating sheet and make the actuating sheet deformed contact the battery casing, whereby the battery casing, the actuating sheet and the polar winding form a current discharging loop.

2. The battery safety device of claim 1, wherein the temperature-controlled expansion element is substantially U-shaped, wherein one end of the temperature-controlled expansion element is a bending portion and the other end of the temperature-controlled expansion element is an opening portion.

3. The battery safety device of claim 2, wherein one side of the opening portion contacts the first conductive portion and the other side of the opening portion presses against the actuating sheet.

4. The battery safety device of claim 1, wherein the temperature-controlled expansion element comprising a packaging bag and a mixture disposed in the packaging bag, wherein the mixture comprises a hydrophilic material.

5. The battery safety device of claim 4, wherein the hydrophilic material is a sodium silicate or a sodium polyacrylate.

6. The battery safety device of claim 4, wherein the packaging bag is an aluminum foil, a wax, a polypropylene, a polycarbonate or a polyethylene.

7. The battery safety device of claim 1, further comprising a trough disposed on the first conductive portion and in the accommodating space, wherein the temperature-controlled expansion element is disposed in the trough.

8. The battery safety device of claim 1, further comprising a fixation base disposed on the first conductive portion in order to fix the conductive handle.

9. The battery safety device of claim 1, wherein the fixation base further comprises positioning slots, and the left extension portion and the right extension portion are disposed in the positioning slots.

10. The battery safety device of claim 1, wherein the actuating sheet is a metal sheet or a flexible element.

* * * * *